United States Patent Office 3,414,572
Patented Dec. 3, 1968

---

3,414,572
BASIC SUBSTITUTED ALKYLXANTHINE DERIVATIVES
Karl Heinz Klingler, Langen, Hesse, Germany, assignor to Deutsche Gold- and Silber-Scheideanstalt vormals Roessler, Frankfurt am Main, Germany
No Drawing. Filed Sept. 7, 1966, Ser. No. 577,608
Claims priority, application Germany, Sept. 9, 1965, D 48,167
3 Claims. (Cl. 260—256)

ABSTRACT OF THE DISCLOSURE

Novel basic substituted alkylxanthine compounds of the formula

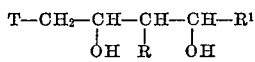

wherein T is a 1,3-dilower alkyl xanthinyl-(7)- or a 3,7-dilower alkyl xanthinyl-(1)-radical, R is hydrogen or alkyl or 1 to 6 C atoms and $R^1$ is a hydroxy aryl and the pharmacologically acceptable acid addition salts which have a favorable effect on coronary blood circulation and heart action and in addition a strong broncholytic action.

---

The present invention relates to novel basic substituted alkyxanthine compounds of the formula

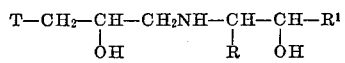

wherein T is a 1,3-dilower alkyl xanthiny-(7)- or a 3,7-dilower alkyl xanthinyl-(1)-radical, R is hydrogen or alkyl of 1 to 6 C atoms and $R^1$ is a hydroxy aryl radical. Preferably, T is the theophyllinyl-(7)-radical, R is hydrogen and $R^1$ is dihydroxy phenyl, especially 3,4-dihydroxy phenyl, as well as their pharmacologically acceptable acid addition salts.

It has been found that these compounds in addition to having a favorable effect on coronary blood circulation and heart action, for example, by providing an increase in coronary circulation and in the heart amplitude also have a broncholytic and antiasthmatic action.

The indications, for instance, are bronchial asthma, bronchopulmonary aliments with asthmatic components (chronic bronchitis, silicoses, emphyses), bronchitides with spastic components, postoperative atelectases; aerosol therapy, if desired, in combination with other medicaments (antibiotics, sulfonamides).

The new compounds can be used in the form of pharmaceutical preparations, if desired, in combination with other pharmacologically active substances, suitable for enteral or parenteral administration.

The administration can be enterally or parenterally, for example, in the form of capsules, tablets, pills, dragees, oily or aqueous solutions or suspensions, as well as by inhalation. The preferred forms are tablets for perlingual and oral application which, for example, contain 5 to 20 mg. of the active substances, as well as solutions or suspensions for aerosol therapy which contain 0.05-0. wt. percent of active substance.

The pharmaceutical preparations can be administered 1 or more times a day, whereby, for example, 1 tablet 3 times a day or, in the aerosol form, one inhalation of the breath, if necessary, several times a day are recommended.

The acute toxicity ($LD_{50}$ in m./kg.) of compounds according to the invention, for example, is 480 mg./kg. upon intraperitoneal injection and 3080 mg./kg. on oral administration.

The compounds according to the invention can, for instance, be produced by reduction of compounds of the formula

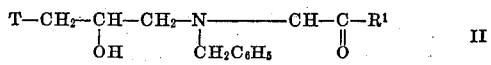

which can be prepared in a known manner illustrated, for example, by refluxing a mixture of 180 g. of 7-(2-hydroxy-3-chloropropyl)-theophylline (prepared according to Chem. Abstracts, 1959, page 18957e), 105 g. of benzyl amine, 135 g. of potassium carbonate, 375 ml. of toluene and 10 ml. of water for 15 hours, cooling the reaction mixture, triturating with water, filtering and recrystallizing the residue from isopropanol to obtain the compound of the formula

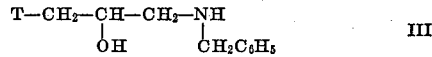

and reacting this compound with a compound of the formula

The reduction of the compounds of Formula II is advantageously effected by catalytic hydrogenation in the presence of a usual catalyst, such as, palladium at 20–80° C. in solvents such as water, methanol, ethanol, water alcohol mixtures.

The exceptional broncholytic action of the compounds according to the invention is exemplified by a comparison of the broncholytic activity of 7-{2-hydroxy-3-[2-(3,4-dihydroxyphenyl)-2-hydroxy-ethylamino] - propyl} - theophylline.HCl (compound A) with that of 7-{2-[2-(3,4-dihydroxy-phenyl)-2-hydroxy-ethylamino] - ethyl} - theophylline.HCl (compound B, see German Patent 1,119,-868) given in the following table.

| Compound: | Broncholytic activity (papaverine=1) |
|---|---|
| A | 500 |
| B | 0.77 |

The following example is illustrative of the compounds according to the invention.

Example

A solution of 17.9 g. of 3,4-dihydroxy-ω-chloroacetophenone in 100 ml. of ethanol was added gradually during a period of 2 hours to a solution of 7-(2-hydroxy-3-benzyl-amino-propyl)-theophylline in 195 ml. of 25% ethanol under a stream of nitrogen with stirring and with a water bath temperature of 80° C. The mixture was stirred at this temperature for a further 2 hours and then acidified with alcoholic HCl. Subsequently, 870 ml. of ethanol were added and the mixture allowed to stand. Thereafter, the hydrochloride of the excess 7-(2-hydroxy-3-benzylamino-propyl)-theophylline which had precipitated (35.3 g.) was filtered off and the filtrate boiled down. The residue was taken up in acetone and then 7-{2-hydroxy-3-[2-(3,4-dihydroxyphenyl)-2-oxo-ethyl-benzylamino]-propyl} - theophylline.HCl which crystallized out after some standing was filtered off. It was boiled with ethanol for purification. Yield 40.0 g., melting point 185–188° C.

The 40.0 g. of the ketone thus produced were dropped in 1280 ml. of 50% aqueous methanol while warming and after the addition of 3.5 g. of a 10% palladium-carbon catalyst hydrogenated at 50° C. When the hydrogen take up ceased, the reaction mixture was filtered and the filtrate again hydrogenated after the addition of a further 3.5 g. of 10% palladium-carbon. Upon completion of the second hydrogenation, the reaction mixture was filtered and boiled down under vacuum. The residue was boiled with ethanol whereupon crystallization occurred. After the mixture cooled down the crystallized product was filtered off and dried. 26.9 g. of 7-{2-hydroxy-3-[2-(3,4-dihydroxyphenyl)-2-hydroxy-ethylamino]-propyl}-theophylline.HCl of a melting point of 209–211° C. were obtained.

The free bases are easily prepared from, for example, the hydrochloride salts of the products according to the invention by adding diluent ammonia to aqueous solutions of the HCl salts. The free bases in turn can be converted to other water soluble pharmaceutically acceptable acid addition salts with other acids, such as, for example, hydrobromic acid, sulfuric acid, phosphoric acid, acetic acid, lactic, acid, tartaric acid, citric acid, gluonic acid, succinic acid, maleic acid and furmaric aid.

I claim:

1. A compound selected from the group consisting of a basic substituted alkyl xanthine compound of the formula

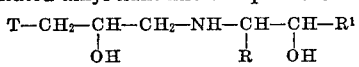

in which T is selected from the group consisting of 1,3-dilower alkyl xanthinyl-(7)- and 3,7-dilower alkyl xanthinyl-(1)-radicals, R is selected from the group consisting of hydrogen and alkyl of 1 to 6 carbon atoms and $R^1$ is hydroxy phenyl and its pharmacologically acceptable acid addition salts.

2. The compound of claim 1 in which T is the theophyllinyl-(7)-radical and $R^1$ is dihydroxy phenyl.

3. The compound of claim 1 in which T is the theophyllinyl-(7)-radical, R is hydrogen and $R^1$ is 3,4-dihydroxy phenyl.

References Cited

UNITED STATES PATENTS

| 2,924,598 | 2/1960 | Bestian | 260—256 |
| 3,124,579 | 3/1964 | Yoshida et al. | 260—256 |

FOREIGN PATENTS

| 1,119,868 | 12/1961 | Germany. |

NICHOLAS S. RIZZO, *Primary Examiner.*

A. M. TIGHE, *Assistant Examiner.*